Oct. 21, 1969 W. H. SEVERNS, JR 3,473,916
PROCESS FOR BENEFICIATING CHROME ORES
Filed Aug. 31, 1966 2 Sheets-Sheet 1

INVENTOR
WILLIAM H. SEVERNS, JR.

BY *Fred C. Carlson*
ATTORNEY

United States Patent Office 3,473,916
Patented Oct. 21, 1969

3,473,916
PROCESS FOR BENEFICIATING CHROME ORES
William H. Severns, Jr., Wilmington, Del., assignor to E. I. du Pont de Nemours and Company, Wilmington, Del., a corporation of Delaware
Filed Aug. 31, 1966, Ser. No. 576,437
Int. Cl. C22b 1/10; C01f 7/02
U.S. Cl. 75—1                                    3 Claims

ABSTRACT OF THE DISCLOSURE

This invention relates to beneficiating iron-containing chrome ore to make an improved chrome ore product having enhanced utility in making superior refractory articles, especially those having a spinel-type bond in their structure. More particularly the invention is directed to such beneficiation processes wherein the proportion of iron in the ore is decreased and the proportion of chromium consequently increased, said processes comprising the steps of (1) establishing in a reaction zone a fluidized suspension of finely divided solid particles of the chrome ore, at a temperature in the range of from about 920° to about 1050° C., by upward flow of a gas through a bed of the particles, the gas comprising a mixture of carbon monoxide and chlorine in a molar ratio of about from 1.1:1 to 4:1; the atom ratio of total chlorine in the input gas mixture during a given period to iron in the ore feed during the same period being from about 2:1 to about 3:1, whereby at least a portion of the iron content of the ore is chlorinated and removed with the upwardly-flowing gas, and (2) recovering from the reaction zone the beneficiated ore having increased chromium content. The invention is further particularly directed to the beneficiated chrome ore so-produced; to processes in which such beneficiated chrome ore is thoroughly mixed with magnesia in a weight ratio of from about 0.67:1 to about 7:1 for magnesia, calculated as MgO, to chromium in said ore, calculated as $Cr_2O_3$, the oxide mixture is pressed to form pellets, and the pellets are fired at a temperature in the range of about 1400 to 1800° C. for about 0.5 to 12 hours, whereby there is produced a spinel-bonded product comprising the oxides of chromium and magnesium; to processes as just described in which a mineralizer such as, for example aluminum, is mixed with the beneficiated ore and magnesia prior to pelleting for the purposes of densification of the particles comprising the pellets and minimizing the fines produced when the pellets are crushed after firing, the $Al:Cr_2O_3:MgO$ weight ratio being about 1:1:4 to 2.5:1:4, whereby the spinel-bonded product formed upon firing comprises the oxides of aluminum, chromium and magnesium; to processes in which these pre-fired pellets and additional beneficiated ore, together with additional magnesia and mineralizers, if desired, are used to produce refractory products; and to the products produced by these processes.

BACKGROUND OF THE INVENTION

Figure 1:
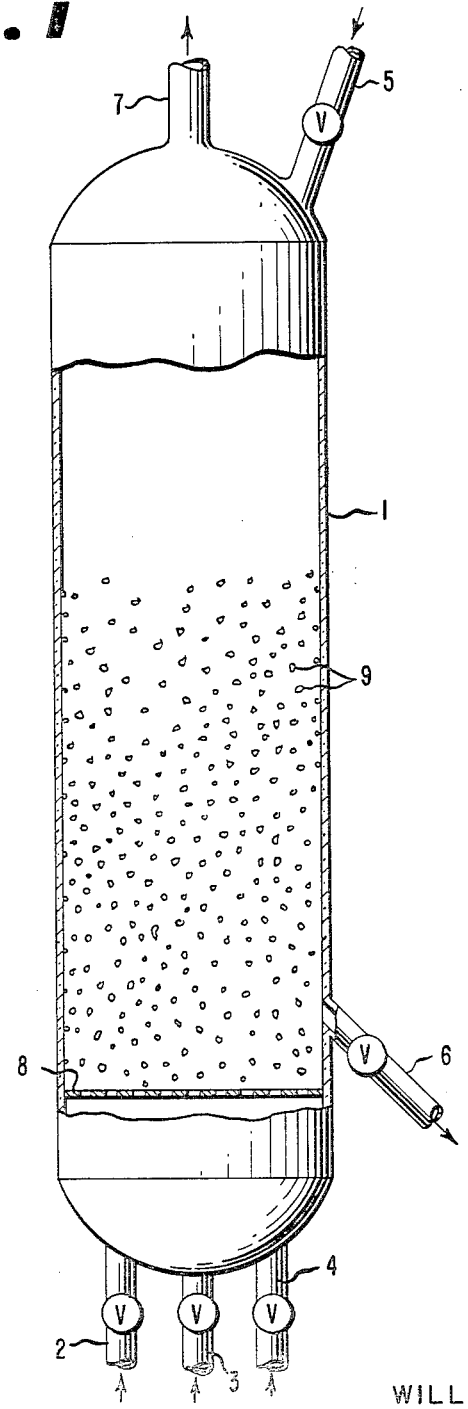

The most desirable chrome ore to be used as a raw material for the manufacture of refractory materials for the steel-making industry is one in which the silica and iron contents are as low as possible. A chromium-to-iron weight ratio of at least three and preferably higher has been found to be very desirable. Ores of low chromium-to-iron ratio are unsuitable for the preparation of refractory bricks used in steel-making furnaces for several reasons: (1) the melting point of such refractories is not high enough to withstand the temperatures at which it is most desirable to operate steel-making processes; (2) these refractories are adversely affected, both chemically and physically, by the slags produced in steel making; and (3) the cyclic changes from oxidizing to reducing atmospheres which occur within the steel-making furnaces result in the bricks becoming friable, spalling and eventurally disintegrating completely. The desirability of beneficiation of low-priced readily available chrome ore is a long-felt need.

A chrome ore which meets the requirements of adequate supply and low price, and which has the additional advantage of being friable and therefore easily processed, is Transvaal ore. The following analysis is typical:

|         | Percent |
|---------|---------|
| $Cr_2O_3$ | 44.5    |
| FeO     | 24.7    |
| $Al_2O_3$ | 15.0    |
| MgO     | 10.0    |
| $SiO_2$ | 5.8     |
|         | 100.0   |

The weight ratio of chromium-to-iron in such ore, however, is only 1.6, so that in its natural condition it is inferior for manufacture of refractories for the steel-making industry.

The processes of the present invention provide for the beneficiation of such readily-available ores as this Transvaal ore, in which the chromium values are relatively low and in which these values are therefore quite cheap, to yield a product in which the weight ratio of chromium to iron is at least three and which may advantageously be used as a raw material for manufacture of refractory products, especially refractory materials for use in the steel-making industry.

An object of the present invention is to chlorinate iron preferentially and remove it from a chrome ore so as to effect an increase in the chromium-to-iron ratio of the ore. A further object is to effect this preferential chlorination by a process which leaves a particularly reactive chromium oxide layer on the surface of the residue ore particles. Another object is to produce, for subsequent use in making refractory objects such as brick, a raw material in which a portion of the chromium oxide is present in a form in which it will readily combine, at only moderately high temperatures, with magnesium oxide to form a highly refractory spinel.

DESCRIPTION OF THE INVENTION

Now according to the present invention it has been found that if a particular chrome ore, containing a higher proportion of iron than is desired, is suspended in a reaction zone at a temperature of about 920° to about 1050° C. by upward flow of a fluidizing gas comprising carbon monoxide and chlorine in a molar ratio of from 1.1:1 to 4:1 and the atom ratio of total chlorine in the input gas to iron in the ore feed during the same period is maintained at from 2:1 to 3:1, at least a portion of the iron content can be preferentially chlorinated and taken off with the effluent gas. leaving the chrome ore with a relatively increased chromium content and in a condition in which it is peculiarly adapted to mixing with magnesia or magnesia and mineralizers such as, for example, aluminum, and, upon firing of such mixtures, to producing spinels useful in making superior refractory articles such as refractory bricks. When making such spinel-bonded refractory articles of superior properties, a chrome ore of minimum silica content is preferably selected as the starting material.

As used in describing this invention, the term "beneficiated ore" means exclusively the product resulting from the beneficiation process herein disclosed and claimed.

Figure 2:

FIGURE 1 shows a fluid bed reactor suitable for use in a chrome ore beneficiation process of the invention, and FIGURE 2 is a photograph of a micrograph of the beneficated ore, taken at a magnification of 32×, showing the individual grains to have a core-and-coating structure.

The chlorination process of this invention is preferably carried out in a reactor of the type shown as FIGURE 1. This figure shows a partial cross-sectional view of a vertically disposed, cylindrical reactor 1 which may be composed of pure silica, silica glass, or other material non-reactive toward the reactants, products, and by-products under the conditions hereinafter described for the chlorination of chrome ores. The reactor is provided with valve-controlled inlet conduits 2, 3, 4 and 5, and with outlet conduits 6 and 7. The reactor is provided wih conventional-type electrical or other desired furnacing means, not shown, to supply the required heat for initiation of the exothermic chlorination reaction. Disposed in the lower portion of the reactor is a perforated grid or porous filter 8 which serves to support and retain the fluidizable ore particles 9 when the ore charge is in repose within the reactor.

In operation of a process of the invention, chrome ore is charged to the reactor and the bed is fluidized by upward flow, through one of the conduits 2, 3, or 4, of gas non-reactive with the chrome ore fed to the reactor while the temperature is being raised to the desired operating range. The reducing and chlorinating gases, carbon monoxide and chlorine respectively, are introduced into the reactor by the remaining of the two conduits indicated as 2, 3, or 4. If desired, the inert fluidizing gas and the reactant gases may all be directed into a single conduit and introduced through this single inlet into the reactor. The product and by-product gases and any excess reactant gases or inert gas present for purposes of fluidization are exhausted from the reactor through the outlet conduit 7. If it is desired to operate the reactor in a continuous manner, or if during a batchwise operation it is desirable to add ore to the reactor, this can be accomplished by means of inlet conduit 5. Also if desired during the operation of the reactor, portions of the bed may be romoved from the reactor through outlet conduit 6.

In FIGURE 2 there is shown a photomicrograph of a cross section of several of the ore particles which have been treated by the process of this invention. There is clearly evident here the coating 2 of chromium oxide which is formed on the cores 1 of chrome ore particles as a result of the chlorination process as herein described.

The conditions which have been found to give satisfactory beneficiation of chrome ores which are high in iron are reduction and chlorination at temperatures of from 920° C. to about 1050° C. in a fluidized bed operation with flow of a mixture of carbon monoxide and chlorine in a molar ratio of from about 1.1:1 to about 4:1. The gas flow is augmented by sufficient inert gas to effect proper fluidization of the bed. For satisfactory operation the atom ratio of chlorine in the input gas in a given period to the iron in the ore feed during the same period should be from 2.5:1 to 3.0:1.

Preferred conditions for the operation of the beneficiation process are: (1) a temperature of about 1000° C., (2) a gas mixture of CO and $Cl_2$ in a molar ratio of about 2.5:1, and (3) augmentation of the gas flow by nitrogen for proper fluidization of the bed. The preferred ratio of $Cl_2$ to Fe values for the operation is dependent upon several technical and economic considerations, including recovery costs for CO and $Cl_2$ in the exit gases. In the operation of the invention, a Cl to Fe ratio of 2:1 has been found quite satisfactory. Under these conditions it has been found that the iron values in ores of the type described will be chlorinated preferentially over the chromium values, and these chloride products will be exhausted from the reactor by the upward flow of gases through the reactor.

The chlorination reaction will take place in such manner that a layer of chromium oxide is formed on the outer portion of the ore particles. Although this layer, as will be observed in FIGURE 2, is of a rather porous nature and has been found to be quite active as regards its ability to be combined subsequently with magnesia to form a highly refractory spinel, its adherence to the original ore particle is such that almost no chromium values are lost by attrition in the fluidized bed reactor.

The invention will be better understood by reference to the following illustrative examples.

EXAMPLE 1

A portion of chrome ore from Grootheboom Mine, Transvaal, was analyzed and found to be almost identical with the ore analysis given above as typical of Transvaal chrome ore. The "as-recieved" ore was run through a jaw-crusher after which a screen analysis showed the following particle size distribution:

| | Percent by wt. |
|---|---|
| 20/40 (U.S. Standard sieve sizes) | 18.6 |
| 40/80 | 59.0 |
| 80/150 | 17.0 |
| −/150 | 5.2 |
| | 99.9 |

A magnetic separation was made on this crushed ore and the major portion of the silica was removed from the ore, the analysis of the ore after this separation being:

| | Percent by wt. |
|---|---|
| $Cr_2O_3$ | 44.0 |
| FeO | 25.4 |
| $Al_2O_3$ | 14.7 |
| MgO | 8.8 |
| $SiO_2$ | 0–2 |

In ores of this type, screening after crushing removes about 90% of the silica present in the ore, since most of the −150 mesh fraction of the ore is composed of silica.

A 3500-gram portion of the crushed and magnetically separated ore, consisting of 300 grams of −4+20 mesh particles and 3200 grams of −20 mesh +150 mesh particles, was charged to a cone-bottom, 3″ × 24″ silica reactor of the type shown in FIGURE 1, and the ore bed was fluidized by a flow of nitrogen while the temperature was being increased to 900° C. When this temperature had been attained, chlorine and carbon monoxide were introduced in equal amounts by weight, at a rate of five grams each per minute. This is a molar ratio of CO to $Cl_2$ of 2.5:1. The feed conditions maintained an atom ratio of total chlorine fed during the period to iron in the ore feed in the same period of about 2.4:1 to 2.8:1. To keep the bed properly fluidized, the rate of nitrogen flow was decreased to 4 grams per minute.

The chlorination reaction is exothermic, and the bed temperature, measured by an internal thermocouple, rose to 1000° C. in 20 minutes. The temperature was held at 1000° C. for the remainder of the three-hour reaction time.

The bed material was cooled under nitrogen flow and the product-residue was analyzed. The input ore contained 30% chromium, so 1050 grams of chromium had been charged to the reactor. From the 3500 grams of ore fed to the reactor there remained 2699 grams of beneficiated ore. By analysis this was found to contain 6% iron or 162 grams, and 38.5% chromium, or 1040 grams of chromium recovered. By analysis of the exit products from the reactor, and of the residue, it was found that 530 grams of iron was removed during the beneficiation process. The chromium-to-iron weight ratio of the residue was therefore 6.4:1 and hence much higher than available in any naturally-occurring ore.

A screen analysis of the beneficiated ore as removed from the reactor showed that, contrary to what might be expected as a result of the fluid bed action, the particle size distribution of the beneficiated ore was almost identical with that of the ore feed.

Particles of the beneficiated ore were examined microscopically and were found to be comprised of a core of ore surrounded by very fine $Cr_2O_3$. This is shown by the photomicrograph, FIGURE 2. That the outer layer was, in fact, $Cr_2O_3$ was verified by removal of the coating as slime by agitated leaching of a portion of the residue in water and appropriate chemical analyses. The fine $Cr_2O_3$ coating, however, is sufficiently adherent that it is not removed by the flow of gas in the fluidized bed, nor by attrition within the reactor bed.

Using the same apparatus and conditions as given above in this example and with portions of Transvaal ore of almost identical composition with that given above, ten additional beneficiation reactions were carried out. Analyses of the beneficiated ore gave average results as follows:

| | Percent by wt. |
|---|---|
| $Cr_2O_3$ | 58.3 |
| FeO | 7.8 |
| $Al_2O_3$ | 14.5 |
| $SiO_2$ | 1.22 |
| MgO | 15.0 |

Using the same conditions of particle size ore, gas feed composition, temperature, and time, but with a static rather than a fluid bed reaction, no selective chlorination of the chromium was obtained. Large amounts of purple $CrCl_3$ were in evidence when the reaction was carried out in a shaft furnace operation, in contrast to the green $Cr_2O_3$ in evidence as a result of the fluidized bed process.

EXAMPLE 2

A beneficiated ore product made according to the process described in detail in Example 1, had the following analysis:

| | Percent by wt. |
|---|---|
| $Cr_2O_3$ | 58.3 |
| FeO | 7.8 |
| $Al_2O_3$ | 14.5 |
| MgO | 15.0 |
| $SiO_2$ | 1.22 |

A 52-gram portion of this ore was ground in a ball mill with 148 grams of MgO added as magnesium hydroxide. To pelletize this ore—magnesium hydroxide mixture, a small amount of water was added and pellets measuring 1″ x ⅝″ were pressed at 5,000 p.s.i. These pellets were heated at 1650° C. for 1 hour in a direct-fired propane-air fueled furnace. After cooling, the pellets were divided into two equal portions. One portion was crushed and dry ground for 3 hours in a steel ball mill using steel balls. After grinding, the powder was found to be —325 mesh in particle size. The second portion of the roasted pellets was hand-crushed using a mortar and pestle to give coarser particles in the following size ranges:

| Mesh: | Percent |
|---|---|
| —20+28 | 4.7 |
| —28+40 | 46.2 |
| —100 | 49.1 |

Forty parts of the —325 mesh powder obtained by ball milling the fired pellets were combined with 14 parts of the hand-crushed material and 46 parts of the ore which resulted from the beneficiation process described in Example 1, this ore being of the same size fractions as was the 14 parts of hand-crushed, prefired material. This mixture was calculated to give a 60% beneficiated chrome ore—50% MgO weight ratio on the finished refractory. Sufficient water and organic binder were added to facilitate pressing of a test bar 3″ x ½″ under pressure 5,000 p.s.i. This bar was dried and fired to a temperature between 1710° C. and 1720° C. for 2½ to 3 hours.

The hot strength of the bar was determined by loading over 1″ span at 1260° C. in conventional strength-testing apparatus. The bar was brought to temperature over a period of 3 hours and allowed to soak at the test temperature for 15 minutes before the load was applied. The modulus of rupture of this bar was determined to be 1220 p.s.i.

EXAMPLES 3 TO 9

Using the procedure of Example 2, but with different amounts of beneficiated chrome ore and magnesia (as magnesium hydroxide) and optionally with powdered aluminum present during formation of the prefired pellets, and with varying amounts of fine and coarse additional beneficiated ore added prior to a second firing, further test bars were produced and tested as summarized in Table I, below.

In these examples, the beneficiated chrome ore had the composition described in Example 2. The beneficiated ore was mixed, by ball milling, with the MgO as magnesium hydroxide. This ground powder mixture was pelletized and fired at 1650° C. for 1 hour. The pellets were divided into two portions; one portion was ball milled and the second portion hand crushed as described in Example 2. To form a test bar, the ground powder of the prefired material and the coarse-crushed prefired powder in the indicated proportions were blended, and, in the instances shown, mixed with additional amounts of beneficiated chrome ore. The test bar was pressed, fired, and tested as in Example 2.

TABLE I.—COMPOSITIONS AND TEST RESULTS FOR REFRACTORY BAR

| | Composition of pellets, wt. percent | | Ground pellets, 1st firing, wt. percent | | Beneficiated chrome ore wt. percent | | 1,260° C. rupture modulus. p.s.i. |
|---|---|---|---|---|---|---|---|
| | Benef. Cr ore | MgO | Fine-grnd. | Hand-crushed | —325 mesh fraction | Coarse fraction | |
| Example: | | | | | | | |
| 2 | 26.0 | 74.0 | 40.0 | 14.0 | None | 46.0 | 1,220 |
| 3 | 37.6 | 62.4 | 40.0 | 24.5 | None | 35.5 | 2,060 |
| 4 | 48.4 | 51.6 | 40.0 | 37.4 | None | 22.6 | 3,020 |
| 5 | 26.0 | 74.0 | 14.0 | 40.0 | 46.0 | None | 3,440 |
| 6 | 37.6 | 62.4 | 24.5 | 40.0 | 35.5 | None | 4,040 |
| 7 | 48.4 | 51.6 | 37.4 | 40.0 | 22.6 | None | 5,490 |
| 8 | 25.0+12.5 Al | 62.4 | 40.0 | 24.5 | None | 35.5 | 2,580 |
| 9 | 25.0+12.5 Al | 62.4 | 24.5 | 40.0 | 35.5 | None | 3,430 |

In each of Examples 2 through 7, the ratio of chrome ore to magnesia in the finished bar is 60 to 40.
In Examples 8 and 9 which contained aluminum, the ore to magnesia ratio is 52 to 40.

EXAMPLES 10 THROUGH 22

Additional refractory bars were prepared using beneficiated chrome ore with (1) varying amounts of magnesia in the form of magnesium oxide, (2) magnesia prepared by firing magnesium oxide before mixing this with any beneficiated ore, and (3) a hard-fired commercial magnesia, known as HW 98, obtained from Harbeson-Walker Refractory Company. The composition of these test bars, the methods of their preparation, and the strength test results are shown in Table II.

In the preparation of each of the bar specimens listed in Table II, a first-fired composition as listed in Section A of the table, was prepared. This prefired material was crushed, particle size fractionated, and portions as indicated were used with additional amounts of beneficiated chrome ore. To prepare the bar specimens, varying amounts of the pre-fired, crushed magnesium-chrome ore compositions of Section A were blended with additional beneficiated chrome ore, and in some cases with other additives as shown in Section B of the table. These mixtures were formed into bar specimens and these bars fired at the temperatures indicated for 3 hours. Additional information regarding the materials used, the preparation of the bar specimens, and the conditions under which these bars were tested, is given in the Notes following Section B of Table II. These references are indicated by the numbers in parentheses in the table.

in diammonium phosphate solution to give a paste of a consistency which could be trowelled. This paste was used to repair a damaged portion of hearth in an open-hearth steel-making furnace. The mix was fired in place by the normal operating procedures for the furnace, and was found extremely resistant to corrosion and heat cycling. Other portions of the same blend of ore and prefired mix were slurried with additional amounts of pitch in diammonium phosphate solution, and as pastes or as thin slurries, were used in furnace wall repairs as gunning and ramming mixes. In every case the slurry comprising chrome ore and prefired material fired "in use" to a strong, corrosion resistant refractory.

EXAMPLE 24

Gunning, ramming and trowelling mixes were prepared as given in Example 23, except that the beneficiated prefired mix comprised aluminum, this prefired material having been prepared according to the process of Example 9. The process of Example 9 was followed through the point of blending of the beneficiated chrome ore and prefired mix. Instead of pressing this mix to form refractory bars for firing and strength testing, the blend of chrome ore and prefired mix were slurried with pitch in diammonium phosphate solution and used as in Example 23 for steel furnace repairs. Strong, resistant refractories were thus prepared.

TABLE II.—ADDITIONAL REFRACTORY COMPOSITIONS USING BENEFICIATED ORE

| | | Section A | | | | | Section B | | | |
|---|---|---|---|---|---|---|---|---|---|---|
| | | | | | | | | | Firing Temp., ° C.[7] | |
| | | | | | | | | | 1,530 | 1,575 | 1,620 |
| Ex. No. | MgO source[1] | MgO amt., percent | Beneficiated ore amt., percent | Firing temp., ° C.[2] | Size fraction[3] | Amt. used,[4] percent | Additional chrome ore,[5] percent | Other additives[6] | Modulus of Rupture (p.s.i.) | | |
| 10a | Unfired MgO | 74 | 26 | 1,560 | −10 +20 | 40 | 46 | 14% prefired, mix,[8] milled | 900 | 1,300 | 1,060 |
| 10b | do | 74 | 26 | 1,660 | −10 +20 | 40 | 46 | do | 720 | 570 | 780 |
| 11 | do | 74 | 26 | 1,560 | −10 +20 | 40 | 60 | | 370 | 240 | 1,410 |
| 12a | do | 74 | 26 | 1,560 | −10 +20 | 40 | 50 | 10% unfired MgO | 420 | 860 | 1,250 |
| 12b | do | 74 | 26 | 1,660 | −10 +20 | 40 | 50 | do | 270 | 250 | 1,000 |
| 13a | do | 74 | 26 | 1,560 | −10 +20 | 40 | 50 | 8% unfired MgO, 2% Al | 390 | 390 | 1,030 |
| 13b | do | 74 | 26 | 1,660 | −10 +20 | 40 | 50 | do | 370 | 260 | 1,150 |
| 14 | do | 74 | 26 | 50%–1,560 50%–1,660 | +40 −100 | 40 | 60 | | 290 | | 1,440 |
| 15 | do | 74 | 26 | 50%–1,560 50%–1,660 | +40 −100 | 40 | 46 | 14% prefired mix, milled | | 470 | 1,700 |
| 16 | do | 74 | 26 | 50%–1,560 50%–1,660 | +40 −100 | 40 | 46 | 12% prefired mix, milled, 2% Al | | 250 | 1,170 |
| 17 | do | 74 | 26 | 50%–1,560 50%–1,660 | +40 −100 | 40 | 46 | 10% prefired mix, milled, 4% Al | | 380 | 1,470 |
| 18 | do | 74 | 26 | 50%–1,560 50%–1,660 | +40 −100 | 40 | 46 | 12% prefired mix, milled, 2% Al | | 280 | 1,080 |
| 19 | Fired MgO | 100 | | | +40 −100 | 40 | 60 | | | 220 | 1,210 |
| 20 | HW 98 | 100 | | | +40 −100 | 40 | 60 | | | 650 | 1,430 |
| 21 | Fired MgO | 100 | | | +40 −100 | 38 | 60 | 2% Al | | 550 | 1,000 |
| 22 | HW 98 | 100 | | | +40 −100 | 38 | 60 | 2% Al | | 430 | 1,730 |

[1] Unfired Magnesium Oxide commercially available as Merck MarincoH, a product of Merck Chemical Company.
Fired MgO was obtained by a prefiring of the Merck MarincoH to give a hard-fired but quite pure magnesium oxide.
HW 98 is a hard-fired magnesium oxide commercially available from Harbeson-Walker Refractory Company.
[2] In Examples 14 through 18, not enough of the prefired material from heatings at 1,560 or 1,660° C. was available; therefore materials from the two firings were mixed in 50-50 weight proportion.
[3] After the chrome ore-magnesium oxide mixture had been fired for one hour at the indicated temperature, the material was crushed to give −10 +20 mesh particle size fraction and an additional size fraction which is indicated as +40 −100. This latter size means:

| | Weight percent |
|---|---|
| −20 +28 | 4.7 |
| −28 +40 | 46.1 |
| −100 | 49.1 |

[4] Under the column "Amount Used" is indicated the weight percent of the prefired mix which was used with additional chrome ore, and in some cases with other additives, to form the test bar.

[5] The chrome ore which was used in the preparation of these bar specimens was of the particle size analysis indicated in Example 2 above. The percentages are on a weight basis.
[6] Where other additives have been used, the weight percents of these which were combined with the crushed prefired material and the beneficiated chrome ore are given. It will be seen that the percentage of prefired material plus percentage of chrome ore plus percentage of other additives will equal 100% which comprises the composition of the bar specimens which were then fired at the temperatures indicated.
[7] Bars fired at 1,620° C. were processed using those specimens which had been previously fired at 1,530° C. and 1,575° C. after evaluating such bars for 2,300° F. strength. Each bar was carefully crushed in a steel mortar until the material closely approximated the particle size distribution used for the low and medium fired bars. Bars were then formed using the same techniques as in the original-fired bars.
[8] This "prefired mix" was of composition similar to the 40% of material prepared as given in Section A; i.e. 74% unfired MgO fired with 26% beneficiated ore.

EXAMPLE 23

The process described in Example 2 was carried out through the point of mixing 35.5 parts by weight of fine-ground beneficiated ore with 24.5 parts by weight of a fine fraction and 40 parts of a coarse fraction of prefired magnesia-chrome ore mix. In Example 23, however, the blend of ore and prefired mix was not shaped into a bar for subsequent firing, but was slurried with pitch Although in Example 1 the beneficiation process has been described as a batch-wise operation, it is possible, and, in some cases preferable, to operate the process in a continuous manner. In continuous operation, one removes portions of the bed continuously or periodically and feeds continuously or periodically portions of ore to be beneficiated. Although operation of the process in such manner results in less than the maximum chromium-toiron ratio in the beneficiated product, it may still provide the most economical method for commercial operation.

Examples 2 through 22 describe processes in which the beneficiated chrome ore is used in the production of refractory bricks and related furnacing materials. These bricks and related materials have greater strengths than comparable products previously known. It will be seen that the highest strengths in these refractory materials have been obtained when the beneficiated chrome ore in a small particle size is fired with a size-reduced product obtained by blending and prefiring a portion of the beneficiated chrome ore with magnesia.

Although the highest-strength finished refractory bar was prepared using a ratio of added magnesia to chromium oxide of 1.83:1 for the prefired mixture, excellent strength in the finished refractory bars was obtained by using ratios as high as 4.85:1. In bars to which aluminum was added, excellent results were obtained when prefired material was made having a magnesia-to-chromium oxide ratio of 4:1 for the prefired material.

While other explanations are possible for the extremely high strength of the refractory materials which can be obtained from the use of beneficiated chrome ore produced according to this invention, it is believed that during the preferential chlorination of the iron in the chrome ore a particularly reactive layer of chromium oxide is formed on the surface of the ore particles, and that this chromium oxide reacts with magnesia, when beneficiated ore and magnesia are fired together, to form a high-melting spinel. The first-fired material then is bonded by a second firing with more beneficiated chrome ore to give extremely strong, high-temperature-resistant refractory products of the invention.

The use of mineralizers has been illustrated herein by the use of aluminum in the prefired ore-magnesia mix, and also in the final refractory products. Among the other mineralizers which have been used in the same way with equal success are alumina, titania, zirconia, phosphorus pentoxide, boron trioxide, and vanadium pentoxide.

In the examples of the preparation of gunning, ramming, and trowelling mixes, pitch in diammonium phosphate solution was the binder material used. It is possible, of course, to use other binders. The materials preferred are those which will burn out rather slowly when the refractory mix is fired, as, for example, asphalt emulsions.

I claim:
1. In a process for beneficiating an iron-containing chrome ore to decrease the proportion of iron and thereby increase the proportion of chromium therein, the steps comprising (1) establishing in a reaction zone a fluidized suspension of finely divided solid particles of the chrome ore, at a temperature in the range of from about 920° C. to about 1050° C., by upward flow of a gas through a bed of the particles, the gas comprising a mixture of carbon monoxide and chlorine in a molar ratio of from about 1.1:1 to about 4:1, the atom ratio of total chlorine fed in the input gas mixture during a given period to iron in the ore feed during the same period being from about 2:1 to about 3:1, whereby at least a portion of the iron content of the ore is chlorinated and removed with the upwardly-flowing gas, and (2) recovering from the reaction zone the beneficiated ore having increased chromium content.

2. A process of claim 1 in which the chromium: iron molar ratio in the starting ore is not greater than 2:1 and in the beneficiated ore is at least 3:1, the reaction-zone temperature is in the range from 950° C. to 1050° C., and the $CO:Cl_2$ molar ratio in the upwardly-flowing gas mixture is in the range from 2:1 to 2.5:1.

3. As a new manufacture, particles of beneficiated iron-containing chrome ore, having a core portion with a chromium to iron ratio exceeding 3:1, and each particle having a surface of reactive, porous chromium oxide, said reactivity being determined by ready combinability at moderate temperature with magnesium oxide to form highly refractory spinel.

References Cited
UNITED STATES PATENTS

| | | | |
|---|---|---|---|
| 2,277,220 | 3/1942 | Gailey | 75—1 |
| 2,752,301 | 6/1956 | Cooper | 75—1 X |
| 3,144,322 | 8/1964 | Bacon et al. | 75—1 |
| 3,216,817 | 11/1965 | Hartford et al. | 75—1 |

L. DEWAYNE RUTLEDGE, Primary Examiner

E. L. WEISE, Assistant Examiner

U.S. Cl. X.R.

264—65, 86; 75—26, 31, 112